Dec. 26, 1933.  M. STRENGER  1,941,115
WELDED SPIGOT AND SOCKET SAFETY JOINT
Filed Nov. 22, 1929
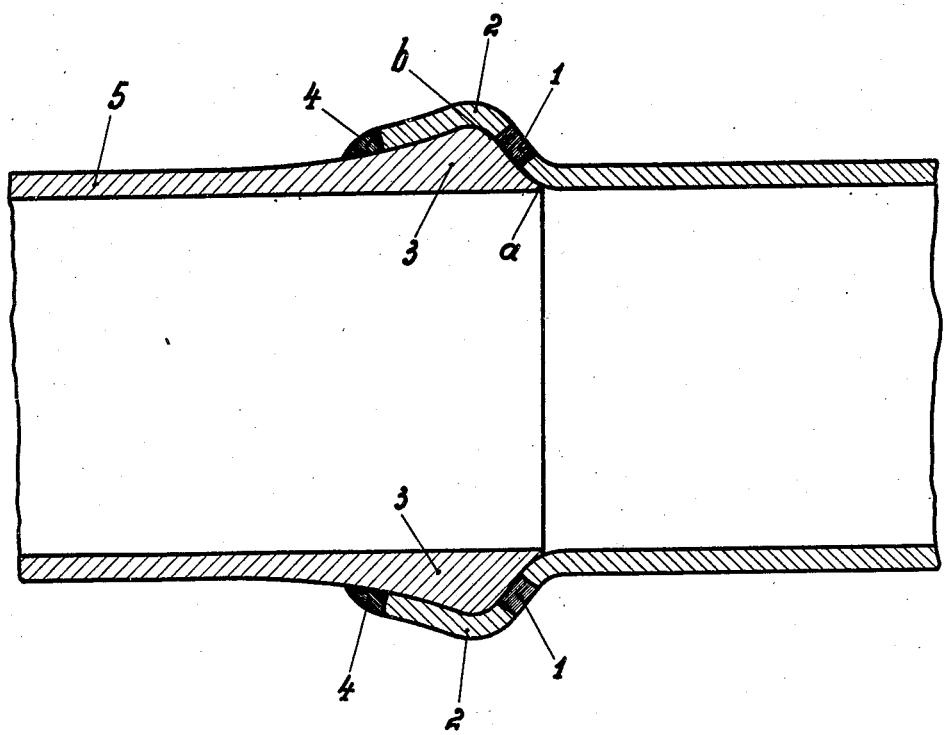
Witnesses:
Inventor:
Moritz Strenger
by
Attorney Patented Dec. 26, 1933

UNITED STATES PATENT OFFICE

1,941,115

WELDED SPIGOT AND SOCKET SAFETY JOINT

Moritz Strenger, Mulheim-Ruhr, Germany, assignor to Vereinigte Stahlwerke Aktiengesellschaft, Dusseldorf, Germany Application November 22, 1929, Serial No. 409,100, and in Germany December 4, 1928

2 Claims. (Cl. 285—111)

Welded spigot and socket safety joints are already known in which the reinforced end or spigot of the inserted pipe terminates in a circular bearing surface which is inclined to the axis of the pipe and bears against the correspondingly inclined bottom of the socket like end of the other pipe and in which the free end of the socket is bent over said spigot and connected thereto by a circumferential welded seam. Such spigot and socket safety joints have the disadvantage that, when compressive or tensile strain is being applied in the longitudinal direction of the pipe either the circumferential welded seam is subjected to a breaking strain as a consequence of the spigot sliding off the bottom of the socket or the spigot is withdrawn from the bottom of the socket, thus causing the formation of a clearance wherein corroding agents may settle.

According to the invention this drawback is being avoided by providing a number of holes in the bottom of the socket which are filled by slot welding thereby producing a rigid sealing engagement between the inclined spigot end and the bottom of the socket.

One embodiment of the invention is illustrated in the annexed drawing.

The plug or slot welding 1 which, according to the diameter of the pipe, may be provided in two or more places prevents the socket 2 from sliding in the direction a—b, when compressive forces are applied on the joint in the longitudinal direction of the pipe. These compressive forces have a tendency to distend or stretch the socket 2 and therefore to lift said socket off the tapering periphery of the spigot 3, seated in said socket 2, thereby subjecting the circumferential welded seam 4 at the front end of the socket to a breaking strain. This possibility is being avoided by the new slot welding.

Another advantage consists in that the tensile forces acting upon the joint with a tendency to stretch or open the bent over part of the socket 2 and at the same time to detach the inclined end of the spigot 3 from the bottom of said socket 2, are now also taken up by the plug or slot welding 1 without any undesired action on the pipe joint, so that no clearance can be formed between the inclined spigot end and the bottom of the socket, wherein corroding agents may settle.

Thus, two essential advantages are being secured by the new plug or slot welding:

(1) The circumferential welded seam is protected against the action of breaking strains when compressive forces are being applied in the longitudinal direction of the pipe and (2) The bottom of the socket is actually welded to the corresponding inclined end of the spigot and therefore cannot be detached from the same when tensile forces are being applied in the longitudinal direction of the pipe.

Having thus described my invention what I claim as new and desire to secure by Letters Patent is:

1. In a welded spigot and socket safety joint for pipe members, wherein the inserted end of one pipe member is provided with a reinforced head or spigot formed with two oppositely tapered faces meeting at their highest points to form a ridge and concentrically disposed with respect to the axis of said one member so that one of said tapered faces forms an exteriorly converging spigot end, and wherein the socket on the other pipe member has a conical bottom which corresponds and is contiguous with the converging spigot end of the other member, while the bell of said socket is bent over aforesaid ridge and closely envelopes the other tapered face of said reinforced spigot, means for retaining said joint intact against failure by tensile strains, comprising a plurality of plug welds in the bottom of said socket uniting the same directly to the contiguous converging end of the spigot similarly to spot welds, which bottom of said socket forms an abruptly conical seat while the corresponding end of said spigot is similarly abruptly conical in form in order to avoid shearing strains upon said plug welds and instead to subject the same to tensile strain when the joint is under tension tending to draw the pipe members apart.

2. In a welded spigot and socket safety joint for pipe members, wherein the inserted end of one pipe member is provided with a reinforced head or spigot formed with two oppositely tapered faces meeting at their highest points to form a ridge and concentrically disposed with respect to the axis of said one member so that one of said tapered faces forms an exteriorly converging spigot end, and where the socket on the other pipe member has a conical bottom which corresponds and is contiguous with the converging spigot end of the other member, while the bell of said socket is bent over aforesaid ridge and closely envelopes the other tapered face of said reinforced spigot, the interior diameter of the spigot being uniform and unchanged throughout, means for retaining said joint intact against failure by tensile strains, comprising a circumferential welded seam connecting the end of said bell to said spigot, and a plurality of plug welds in the bottom of said socket uniting the same directly to the contiguous converging end of the spigot similarly to spot welds, which bottom of said socket forms an abruptly conical seat while the corresponding end of said spigot is similarly abruptly conical in form in order to avoid shearing strains upon said plug welds and instead to subject the same to tensile strain when the joint is under tension tending to draw the pipe members apart.

MORITZ STRENGER.